United States Patent [19]

Raynor

[11] Patent Number: 4,796,914

[45] Date of Patent: Jan. 10, 1989

[54] TRUCK BED LINER WITH BALLAST CHAMBER

[76] Inventor: Leighton A. Raynor, 335 E. Parker Rd., Morganton, N.C. 28655

[21] Appl. No.: 143,765

[22] Filed: Jan. 14, 1988

[51] Int. Cl.⁴ .................................. B62D 33/04
[52] U.S. Cl. ............................ 280/757; 280/5 F; 280/759; 296/39.2
[58] Field of Search ............... 296/39 R, 39 A; 280/759, 757, 5 F

[56] References Cited

U.S. PATENT DOCUMENTS

| D. 248,386 | 7/1978 | Hefner | D12/98 |
|---|---|---|---|
| 1,389,396 | 8/1921 | Sylvester | 280/5 F |
| 2,026,687 | 1/1936 | Lawrenson | 280/5 F |
| 2,395,039 | 2/1946 | Crosby | 280/5 F |
| 2,474,094 | 6/1949 | Colquitt | 280/5 F |
| 2,927,711 | 3/1960 | Naggiar | 280/5 F |
| 2,993,721 | 7/1961 | Bowman | 296/69 |
| 3,881,768 | 5/1975 | Nix | 280/39 R |
| 3,984,141 | 10/1976 | Gilette et al. | 280/5 F |
| 4,186,845 | 2/1980 | Podd | 296/39 R |
| 4,190,281 | 2/1980 | Chandler | 280/759 |
| 4,339,142 | 7/1982 | Tanner et al. | 280/759 |
| 4,341,412 | 7/1982 | Wayne | 296/39 R |
| 4,396,219 | 8/1983 | Cline | 296/39 R |
| 4,441,627 | 4/1984 | Takeuchi | 296/39 R |
| 4,482,169 | 11/1984 | Yim | 280/759 |
| 4,592,583 | 6/1986 | Dresen et al. | 296/39 R |
| 4,752,098 | 6/1988 | Shock | 296/39 R |

*Primary Examiner*—Richard A. Bertsch
*Attorney, Agent, or Firm*—Bell, Seltzer, Park & Gibson

[57] ABSTRACT

A hollow compartment is formed in the bottom wall of the present truck bed protective liner and defines a ballast chamber to permit inserting liquid ballast in the ballast chamber when it is desired to provide additional weight on the rear portion of the truck and also permitting removal of the liquid ballast from the ballast chamber when it is desired to reduce the weight on the rear portion of the truck. The hollow compartment is preferably provided by spaced-apart upper and lower bottom wall members extending substantially throughout the width and length of the protective liner and being joined along their front and side edges to the corresponding front and side walls of the protective liner. A rear wall is joined to the upper and lower bottom walls of the opposed side walls of the liner to completely enclose the ballast chamber.

7 Claims, 1 Drawing Sheet

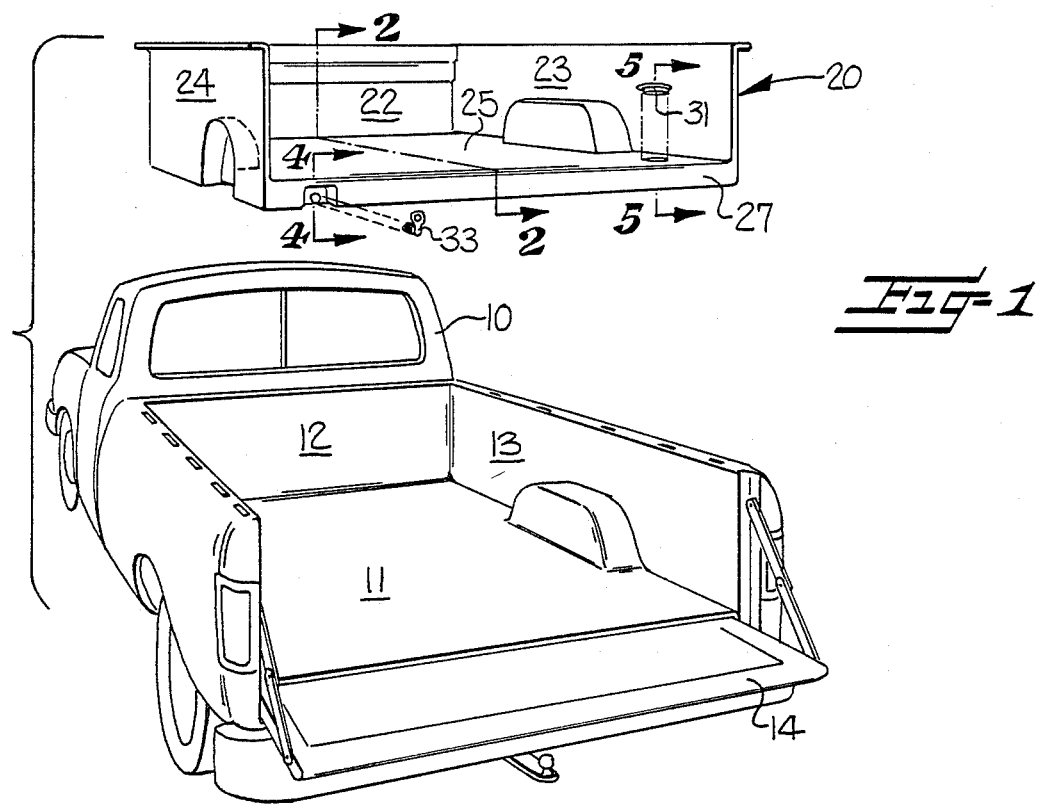
Fig-1
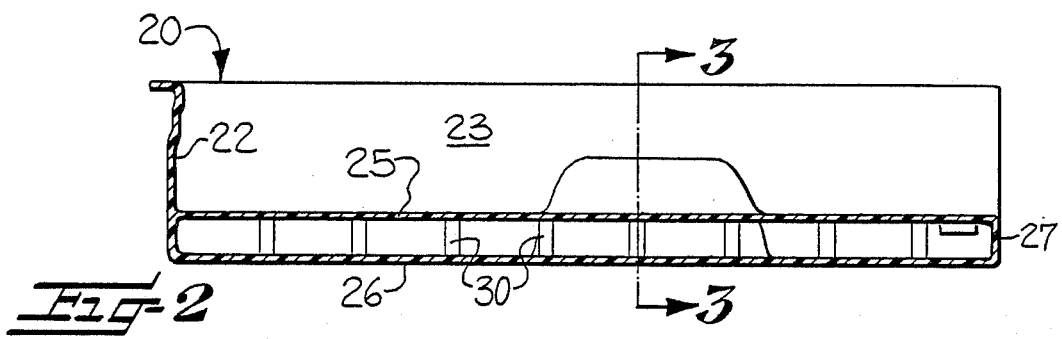
Fig-2
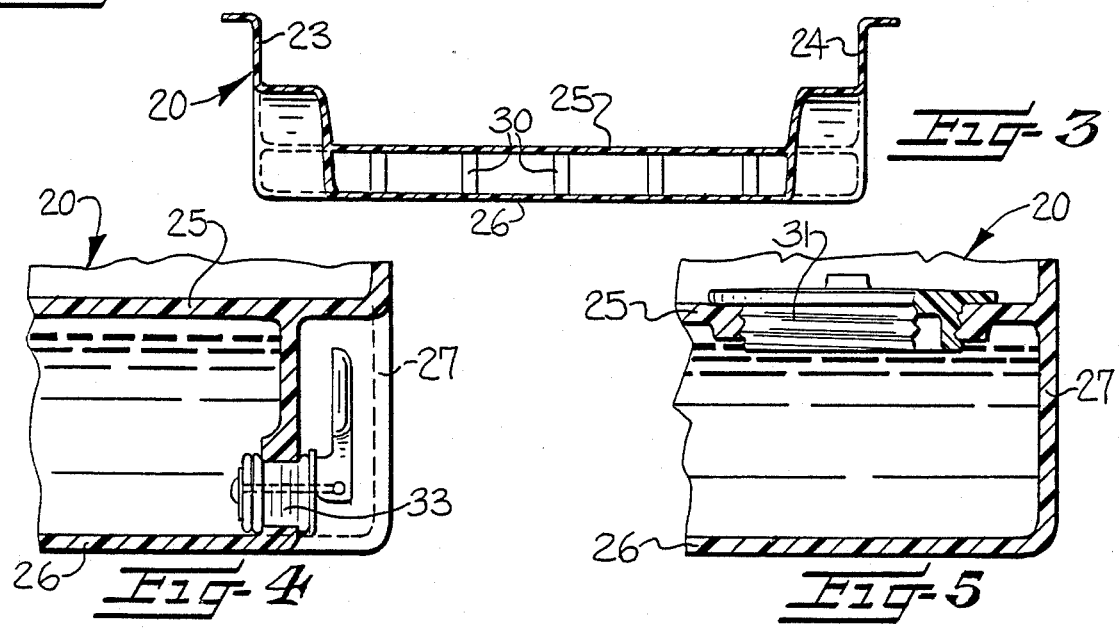
Fig-3
Fig-4
Fig-5

TRUCK BED LINER WITH BALLAST CHAMBER

FIELD OF THE INVENTION

This invention relates generally to a protective bed liner for a pick-up truck, and more particularly to a protective bed liner including a hollow compartment formed therein and defining a ballast chamber for permitting liquid ballast to be inserted therein for providing additional weight on the rear portion of the truck.

BACKGROUND OF THE INVENTION

Light trucks, such as the ordinary pick-up truck, have very little weight on the rear tires when unloaded so that they have very little stability and the rear tires have very little traction, particularly when the truck is being operated on wet, icy or snowy surfaces. When the truck is empty, the rear end portion tends to be too light and has a tendency to skid laterally under slippery conditions. In an attempt to solve this problem, some truck operators load logs or the like in the bed of the truck to provide additional weight on the rear wheels and rear portion of the truck so as to increase the rear tire traction. While the logs or the like do provide additional weight, they must be removed when it is desired to load the truck with other types of cargo.

Recognizing the problems associated with loading and unloading ballast materials from the truck bed when the proper traction conditions are desired, U.S. Pat. No. 2,993,721 discloses the provision of a hollow ballast bumper for pick-up trucks and the like into which water or other liquid can be inserted to provide additional weight on the back end of the truck, and the liquid ballast can be emptied when the truck is loaded. While the compartmentalized bumper of this patent does provide for the use of a liquid ballast to add additional weight to the back end of the truck, the installation of the bumper requires the removal of the conventional bumper. Also, this special type of compartmentalized bumper is relatively expensive and extends outwardly from the rear portion of the truck so that it may provide an obstacle, as well as an unsightly appearance.

SUMMARY OF THE INVENTION

With the foregoing in mind, it is an object of the present invention to provide a protective bed liner with ballast means incorporated in the liner for at times providing stability and traction for the truck in which the protective liner is positioned and which ballast means can be provided at very little additional cost over and above the normal cost of a conventional type of protective bed liner.

In accordance with the present invention, the ballast means includes a hollow compartment formed in the bottom wall of the protective liner and defining a ballast chamber therein. A filling opening is provided for permitting liquid ballast to be inserted in the ballast chamber when it is desired to provide additional weight on the rear portion of the truck, and a drainage opening is provided for permitting removal of the liquid ballast when it is desired to reduce the weight on the rear portion of the truck, such as when the truck bed is loaded.

The hollow compartment defining the ballast chamber extends throughout substantially the entire length and width of the bottom wall of the protective linear and occupies only a very small portion of the cargo space in the bottom portion of the protective liner. The ballast chamber is formed by spaced-apart upper and lower bottom wall members extending substantially throughout the length and width of the protective liner and being joined along their front and side edges to the corresponding front and side walls of the protective liner. A rear wall is joined to the upper and lower bottom wall members to completely enclose the ballast chamber. Spaced-apart support column members are positioned between the upper and lower bottom wall members and support the upper bottom wall member in spaced relationship above the lower bottom wall member. The liquid ballast filling opening is provided in the upper bottom wall member and the liquid ballast drainage opening is positioned in a process formed in the rear wall of the ballast chamber.

BRIEF DESCRIPTION OF THE DRAWINGS

Other objects and advantages will appear as the description proceeds when taken in connection with the accompanying drawings, in which:

FIG. 1 is a perspective rear view of a conventional pick-up truck and illustrating the protective bed liner of the present invention elevated above the truck bed;

FIG. 2 is a longitudinal vertical sectional view of the bed liner taken substantially along the line 2—2 in FIG. 1;

FIG. 3 is a transverse sectional view of the bed liner taken substantially along the line 3—3 in FIG. 2;

FIG. 4 is an enlarged fragmentary vertical sectional view taken substantially along the line 4—4 in FIG. 1; and FIG. 5 is an enlarged fragmentary vertical sectional view taken substantially along the line 5—5 in FIG. 1.

DESCRIPTION OF THE PREFERRED EMBODIMENT

A conventional type of pick-up truck 10 is illustrated in FIG. 1 with a truck bed including a floor 11, a front wall 12, opposite side walls 13, and a rear access opening adapted to be at times closed by a tailgate 14. The protective liner of the present invention, broadly indicated at 20, is preferably formed of molded plastic material and is shaped to be inserted in and closely fit the bed of the truck 10. The protective liner 20 is shown positioned above the bed of the truck in FIG. 1. The protective liner 20 includes a front wall 22, opposite side walls 23, 24, and spaced-apart upper and lower bottom wall members 25, 26 joined along their front and side edges to the corresponding front and side walls of the protective liner. A rear wall 27 is joined to the upper and lower bottom walls 25, 26, and to the opposed side walls 23, 24 to form a hollow compartment in the bottom wall of the protective liner 20. The hollow compartment defines a ballast chamber therein. In order to provide support for the upper bottom wall 25, a plurality of spaced-apart support column members 30 is positioned between the upper and lower bottom wall members 25, 26 to support the upper bottom wall member 25 in spaced relationship above the lower bottom wall member 26.

A filling opening is provided in the upper wall member 25 and is provided with a removable filling opening cap 31 (FIG. 5) for permitting liquid ballast to be inserted in the ballast chamber when it is desired to provide additional weight on the rear portion of the truck, such as when the truck is being operated with the truck bed substantially empty. A drainage opening is provided in the bed liner and is illustrated as being provided in an indentation or recess in the rear wall 27. The drainage opening is provided with a manually operable drainage plug 33 (FIG. 4) which may be removed to permit removal of the liquid ballast in the ballast chamber when it is desired to reduce the weight on the rear portion of the truck, such as when the truck bed is loaded with cargo.

The liquid ballast in the hollow compartment formed in the bottom wall of the protective liner 20 can be any suitable type of liquid material, such as water or the like. The distance between the upper bottom wall member 25 and the lower bottom wall member 26 can vary, depending upon the weight to be added to the rear of the truck. In most instances, sufficient weight should be added if the wall members 25, 26 are spaced apart a distance of from about three to six inches.

The present protective liner 20 provides protection for the pick-up truck bed in the same manner as a conventional protective liner and additionally provides ballast means in the form of a hollow compartment formed in the bottom wall of the protective liner. The hollow compartment defining the ballast chamber can be formed in the protective liner in an economical manner and takes up a very small amount of the normal cargo space of the truck bed. The formation of the hollow compartment forming the ballast chamber in the protective liner does not materially increase the cost of the bed liner and does not distract from the appearance thereof.

In the drawings and specification there has been set forth the best mode presently contemplated for the practice of the present invention, and although specific terms are employed, they are used in a generic and descriptive sense only and not for purposes of limitation, the scope of the invention being defined in the claims.

I claim:

1. In a protective liner for a truck bed including a floor, a front wall, opposed side walls, and a rear access opening, said linear being shaped to be inserted in the truck bed and including corresponding bottom, front and opposed side walls, the combination therewith of ballast means incorporated in said protective liner for at times providing stability and traction for the truck in which said protective liner is positioned, said ballast means comprising a hollow compartment extending substantially throughout said bottom wall of said protective linear and defining a ballast chamber therein, a filling opening for permitting liquid ballast to be inserted in said ballast chamber when it is desired to provide additional weight on the rear portion of the truck, and a drainage opening for permitting removal of the liquid ballast from said ballast chamber when it is desired to reduce the weight on the rear portion of the truck.

2. A protective linear according to claim 1 wherein said bottom, front and opposed side walls of said liner are integrally formed of molded plastic material.

3. A protective liner according to claim 1 wherein said hollow compartment defining said ballast chamber extends throughout substantially the entire length and width of said bottom wall of said protective liner.

4. A protective liner according to claim 1 wherein said ballast chamber in said bottom wall includes spaced-apart upper and lower bottom wall members extending substantially throughout the width and length of said protective liner, said spaced-apart upper and lower wall members being joined along their front and side edges to the corresponding front and side walls of said protective liner, and including a rear wall joined to said upper and lower bottom wall members and to said opposed side walls of said liner to completely enclose said ballast chamber.

5. A protective liner according to claim 4 wherein said liquid ballast filling opening is provided in said upper bottom wall member.

6. A protective liner according to claim 4 wherein said liquid ballast drainage opening is positioned in said rear wall of said ballast chamber.

7. A protective liner according to claim 4 including spaced-apart support column members positioned between said upper and lower bottom wall members and supporting said upper bottom wall member in spaced relationship above said lower bottom wall member.

* * * * *

UNITED STATES PATENT AND TRADEMARK OFFICE
CERTIFICATE OF CORRECTION

PATENT NO. : 4,796,914
DATED : January 10, 1989
INVENTOR(S) : Leighton A. Raynor It is certified that error appears in the above-identified patent and that said Letters Patent is hereby corrected as shown below:

Column 1, line 66, "linear" should be -- liner --.

Column 2, line 14, "process" should be -- recess --.

Column 4, line 6, "linear" should be -- liner --.

Column 4, line 14, "linear" should be -- liner --.

Signed and Sealed this

Second Day of May, 1989

*Attest:*

DONALD J. QUIGG

*Attesting Officer*      *Commissioner of Patents and Trademarks*